US006762992B1

(12) United States Patent (10) Patent No.: US 6,762,992 B1
Lemieux (45) Date of Patent: Jul. 13, 2004

(54) RING TOPOLOGY WIRELESS LOCAL LOOP SYSTEM AND FALLBACK METHOD TO CONVENTIONAL CELLULAR SYSTEM

(75) Inventor: Yves Lemieux, Kirkland (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 09/574,118

(22) Filed: May 17, 2000

(51) Int. Cl.[7] ............................................. H04L 12/26
(52) U.S. Cl. ..................................................... 370/216
(58) Field of Search ........................ 370/468, 542–545, 370/280, 356, 216, 210, 208; 379/218.01; 709/223, 229; 455/561, 507, 560; 358/412

(56) References Cited

U.S. PATENT DOCUMENTS

| | | | |
|---|---|---|---|
| 5,235,632 A | 8/1993 | Raith | 379/59 |
| 5,564,072 A | 10/1996 | Garcia Aguilera et al. | 455/56 |
| 6,011,978 A | 1/2000 | Ault et al. | 455/552 |
| 6,188,912 B1 * | 2/2001 | Struhsaker et al. | 455/561 |
| 6,246,695 B1 * | 6/2001 | Seazholtz et al. | 370/468 |
| 6,317,224 B1 * | 11/2001 | Lutgen et al. | 358/412 |
| 6,452,942 B1 * | 9/2002 | Lemieux | 370/468 |
| 6,570,974 B1 * | 5/2003 | Gerszberg et al. | 379/218.01 |
| 6,639,913 B1 * | 10/2003 | Frankel et al. | 370/356 |

FOREIGN PATENT DOCUMENTS

WO  WO 99 65179 A  12/1999

OTHER PUBLICATIONS

Lemieux, Yves : << 4.2 Wireless—DSLAM >> Ericsson Research Canada Inc., Jun. 5, 2000, XP002901997 http://www.issls-council.org/proc00/papers/4_2.pdf[retrieved on Oct. 30, 2001] the whole document.

Sudhir Dixit et al. : << Data rides high on high–speed remote access >> IEEE Communications Magazine, Jan. 1999, pp. 130–141, XP002901998 http://ieeexplore.ieee.org/ie14/35/15968/00739316.pdf?is No.=15968, pp. 130,136,139,141.

SONET/SDH : High–speed communications technology for the next century >> Transwitch Engines for Global Connectivity, 1998, XP002901999 http://www.transwith.com/files/com/com98win.pdf. The whole document.

International Search Report No. PCT/SE01/01112 dated Dec. 5, 2001.

* cited by examiner

Primary Examiner—Chi Pham
Assistant Examiner—Prenell Jones
(74) Attorney, Agent, or Firm—Jenkens & Gilchrist

(57) ABSTRACT

Digital subscriber line access multiplexers are interconnected in a ring topology via wireless links. Each network terminal provides local loop access to a subscriber device and is connected to a digital subscriber line access multiplexer via a wireless access link. This wireless local loop system is overlaid by a conventional cellular communications system capable of supporting wireless communications with cellular mobile stations. In the event of a failure in the wireless local loop system that would leave a certain network terminal stranded with respect to its communications service, that stranded network terminal shifts from use of its wireless access link to instead utilize the cellular system air interface for its subscriber device communications. An adjustment in the rate of subscriber device communications is made to account for any difference in the throughput supported by the wireless access link and the throughput supported by the cellular air interface.

10 Claims, 3 Drawing Sheets

RING TOPOLOGY WIRELESS LOCAL LOOP SYSTEM AND FALLBACK METHOD TO CONVENTIONAL CELLULAR SYSTEM

CROSS-REFERENCE TO RELATED APPLICATIONS

The present application for patent is related to previously filed, co-pending, commonly owned application for patent Ser. No. 09/316,409 entitled "System and Method for Providing Wireless Local Loop Access Using an Access Multiplexer" by Yves Lemieux filed May 20, 1999, the disclosure of which is hereby incorporated by reference.

BACKGROUND OF THE INVENTION

1. Technical Field of the Invention

The present invention relates to wireless local loop communications systems and, in particular, to a ring topology configured wireless local loop system possessing with a communications fallback procedure to an overlaid cellular communications system for wireless local loop subscribers in the event of a local loop system failure.

2. Description of Related Art

Reference is now made to FIG. 1 wherein there is shown a functional block diagram of a wireless local loop arrangement 100 using a wireless Digital Subscriber Line Access Multiplexer (W-DSLAM or a "radio head") module 102. A high-speed common carrier network 104 is connected from one of its Asynchronous Transfer Mode ATM switches 106 to the W-DSLAM module 102 over a high-speed wireless link (aggregate path) 108. The aggregate throughput provided via the wireless link 108 is approximately 40.0 Mbps. The W-DSLAM 102 functions to multiplex this aggregate throughput into a plurality of wireless distribution channels 110. Each wireless distribution channel 110 is capable providing a throughput of between (approximately) 384 Kbps and (approximately) 2 Mbps. At these operating throughput rates, the W-DSLAM 102 is capable of concentrating a substantial number of channels into the single high speed wireless aggregate path link 108. Each of the wireless distribution channels 110 is terminated with a network termination (NT) node or module 112 that is provided at a user's (or subscriber's) home, office, business, or any other facility. The network termination module 112 may further operate in a multiplexing fashion to allow plural devices (D) 114, each requiring a portion of the bandwidth provided by the wireless distribution channel 110, to be connected for communication. Examples of such devices 114 include: a computer, a telephone, home appliances, office devices, and microprocessor controlled components and the like.

The high-speed common carrier network 104 is provided as a Synchronous Optical Network (SONET) or related Synchronous Digital Hierarchy (SDH) ring 120 formed from a plurality of cable interconnected ATM Add/Drop Multiplexers (ADM) 122. Other network elements, such as a server 124, routers 126, and ATM switches 106 are interconnected to the ring 120. The ATM switches 106 connecting with the W-DSLAM 102 over the link 108 comprises a point of presence (POP) node for providing wireless local loop arrangement 100 access to the common carrier network 104. This POP ATM switch 106 is preferably connected to one of the ring ATM/ADM modules 122 via a high-speed link 130 capable of throughput in the order of several hundred megabits per second. As one example, the high-speed link 130 may be implemented to transport an Optical Carrier 12 (OC-12) optical signal with a throughput of around 622.080 Mbps.

The wireless local loop distribution channels 110 may advantageously utilize the Digital Subscriber Line (DSL) modem technology to support transmission operating rates that are capable of delivering a host of broadband applications such as multimedia, video-teleconferencing, video-on-demand, games-on-demand, and the like. Preferably, a suitable Time Division Multiple Access (TDMA) scheme may be utilized for the air interface required for implementing these distribution channels 110. Further, the air interface may be provided in accordance with standard protocols such as ANSI-136 or GSM, using a common carrier signal, for example, a 200 KHz (for a 384 Kbps data rate) or 1.6 MHz (for data rates up to 2 Mbps) signal.

SUMMARY OF THE INVENTION

A wireless local loop communications system is provided wherein a plurality of digital subscriber line access multiplexers are interconnected with each other in a ring topology via a plurality of first wireless communications links. Each included network terminal providing local loop access to a connected subscriber device is connected to an associated one of the digital subscriber line access multiplexers via second wireless communications link. The first and second wireless communications links support communication transmissions at a first and second throughput rate, respectively, wherein the second throughput rate is less than the first throughput rate.

The wireless local loop system is overlaid by a conventional cellular communications system. The cellular communications system includes a base station in each cell capable of supporting wireless communications with cellular mobile stations over an air interface. In the event of a failure in the wireless local loop system that would leave a certain network terminal stranded with respect to its communications service, that stranded network terminal instigates a mode shift from use of the second wireless communications link to instead utilize the cellular system air interface for its subscriber device communications. The air interface supports communication transmissions at a third throughput rate that is less than the second throughput rate, and accordingly the communication being handled by the stranded network terminal has its throughput adjusted with the mode shift to match the cellular air interface supported throughput.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
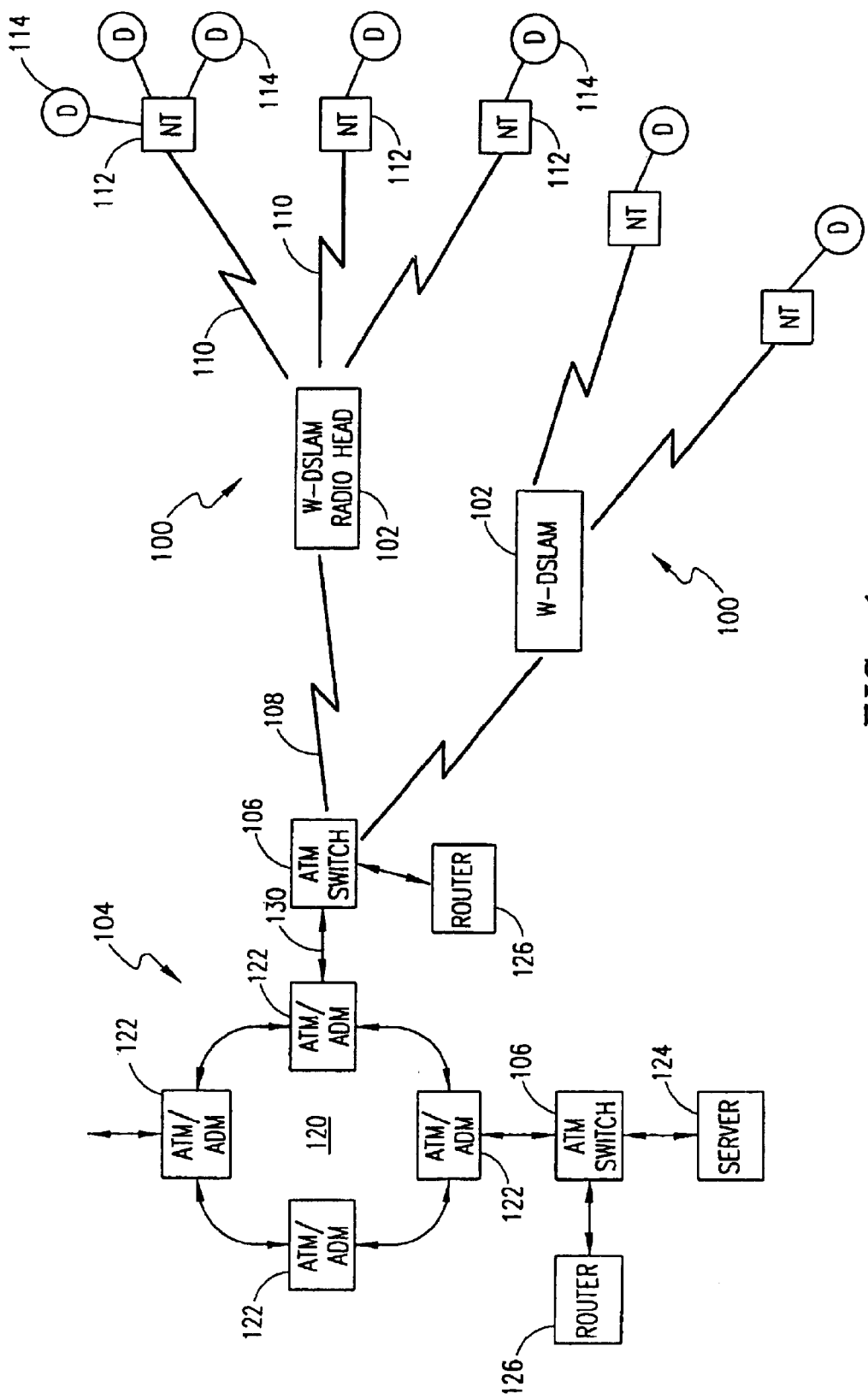
FIG. 1 (previously described) is a functional block diagram of an exemplary wireless local loop arrangement using a wireless Digital Subscriber Line Access Multiplexer (W-DSLAM) module in tree topology configuration.

The network topology illustrated in FIG. 1 exemplifies the standard "tree attached to a ring" topology that has historically been used in connection with wireline communications networks. While this is a standard and acceptable topology architecture in a wireline environment, it is not optimal for use in wireless implementation such as that provided through the wireless links 108 and 110 of the wireless local loop arrangement 100 (comprising the branches of the tree) The topology suffers from radio degradation issues and is limited in its fallback measures due to the lack of a rerouting mechanism. The present invention provides a solution to each of these issues.

Figure 2:
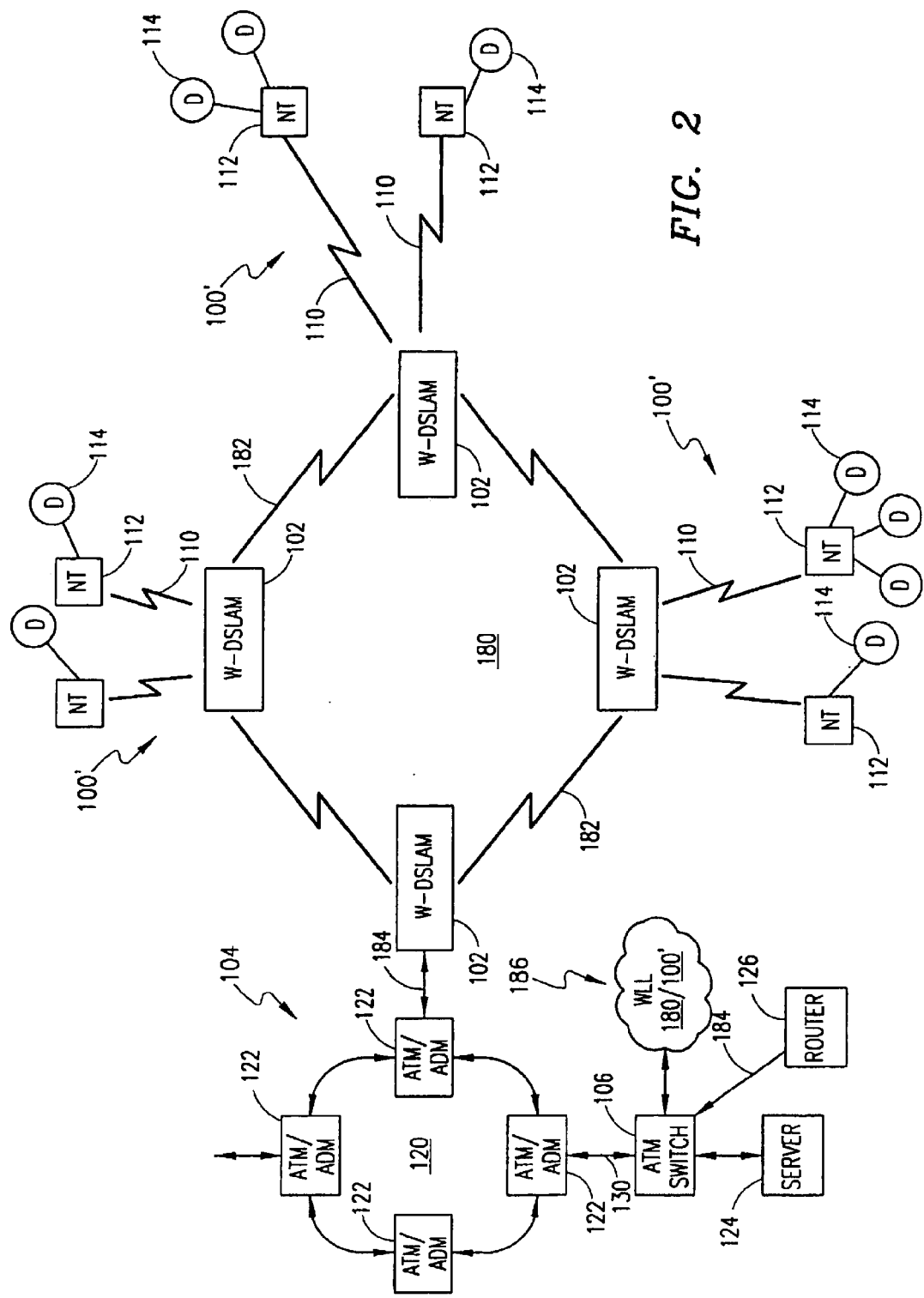
FIG. 2 is a functional block diagram of a wireless local loop arrangement and its supporting topology configuration in accordance with the present invention using a plurality of wireless Digital Subscriber Line Access Multiplexer (W-DSLAM) modules connected in a wireless ring.

Reference is now made to FIG. 2 wherein there is shown a functional block diagram of a wireless local loop arrangement 100' and its supporting topology configuration in accordance with the present invention. A high speed wireless local loop network is provided as a ring 180 formed from a plurality of wireless Digital Subscriber Line Access Multiplexer (W-DSLAM) modules 102. These W-DSLAM modules are interconnected with each other in the ring 180 topology via high-speed wireless links (aggregate paths) 182. The aggregate throughput provided via each of the wireless links 182 in the ring is approximately 40.0 Mbps. Each W-DSLAM 102 functions to multiplex this aggregate throughput into a plurality of wireless distribution channels 110. Each wireless distribution channel 110 is capable providing a throughput of between (approximately) 384 Kbps and (approximately) 2 Mbps. At these operating throughput rates, each W-DSLAM 102 is capable of concentrating a substantial number of channels (flows) into the single high speed wireless aggregate path link 182 (flow) of the ring 180. Each of the wireless distribution channels 110 is terminated with a network termination (NT) node or module 112 that is provided at a user's (or subscriber's) home, office, business, or any other facility. The network termination module 112 may further operate in a multiplexing fashion to allow plural devices (D) 114, each requiring a portion of the bandwidth provided by the wireless distribution channel 110, to be connected for communication. Examples of such devices 114 include: a computer, a telephone, home appliances, office devices, and microprocessor controlled components and the like.

A high-speed common carrier network 104 is connected to the wireless local loop network ring 180. The high-speed common carrier network 104 is provided as a Synchronous Optical Network (SONET) or related Synchronous Digital Hierarchy (SDH) ring 120 formed from a plurality of ATM Add/Drop Multiplexers (ADM) 122. Other network elements, such as a server 124, routers 126, and ATM switches 106 are interconnected to the ring 120. One of the W-DSLAM modules 102 of the wireless local loop network (acting as a gateway) is connected to one of the Add/Drop Multiplexers 122 of the common carrier network 104 via a high-speed link 184 capable of throughput in the order of several hundred megabits per second. As one example, the high-speed link 184 may be implemented to transport an Optical Carrier 12 (OC-12) optical signal with a throughput of around 622.080 Mbps. As another example, the high-speed link 184 may be implemented to transport an Optical Carrier 3 (OC-3) optical signal with a throughput of around 155.52 Mbps.

Alternatively, the gateway W-DSLAM module 102 of the wireless local loop network may be connected through an ATM switch 106 via the high speed link 184 (as generally indicated at 186) The ATM switch 106 connecting with the W-DSLAM 102 over the link 184 comprises a point of presence (POP) node for providing wireless local loop arrangement 100 access to the common carrier network 104. This POP ATM switch 106 is preferably connected to one of the ring ATM/ADM modules 122 via a high-speed link 130 also capable of throughput in the order of several hundred megabits per second. As one example, the high-speed link 130 may be implemented to transport an Optical Carrier 12 (OC-12) optical signal with a throughput of around 622.080 Mbps.

The wireless local loop distribution channels 110 may advantageously utilize the Digital Subscriber Line (DSL) modem technology to support transmission operating rates that are capable of delivering a host of broadband applications such as multimedia, video-teleconferencing, video-on-demand, games-on-demand, and the like. Preferably, a suitable Time Division Multiple Access (TDMA) scheme may be utilized for the air interface required for implementing these distribution channels 110. Further, the air interface may be provided in accordance with standard protocols such as ANSI-136 or GSM, using a common carrier signal, for example, a 200 KHz (for a 384 Kbps data rate) or 1.6 MHz (for data rates up to 2 Mbps) signal.

The provision of a ring 180 topology to interconnect the multiple W-DSLAM modules 102 of the wireless local loop network (to the ring 120 of the common carrier network 104) instead of a tree topology (as illustrated in FIG. 1) provides a number of benefits and advantages:

- the access network does not rely on one point-of-failure in case of re-routing (in the sense that none of the nodes are 100% relied upon to carry the user traffic);
- the ring has a normal foot-print, in the context of the inner and outer W-DSLAM module coverage, which is similar to that of one big cell. At the limit, this one ring could be considered to comprise one large cell;
- the large cell has fallback options to other communications systems (as will be discussed in greater detail below);
- SONET transport mechanisms are more of the ring type than the tree type, and thus the transport between W-DSLAM nodes could also be SONET based in the event any two or more of the W-DSLAM modules are interconnected with SONET fibers (instead of wireless links 182); and
- rings are advantageously self-healing which implies that the node that fails could continue to be served (even if not used as transit or repeater node). Traffic in such a case could be completely diverted counter-clockwise (if the default traffic direction was clockwise or vice-versa).

Figure 3:
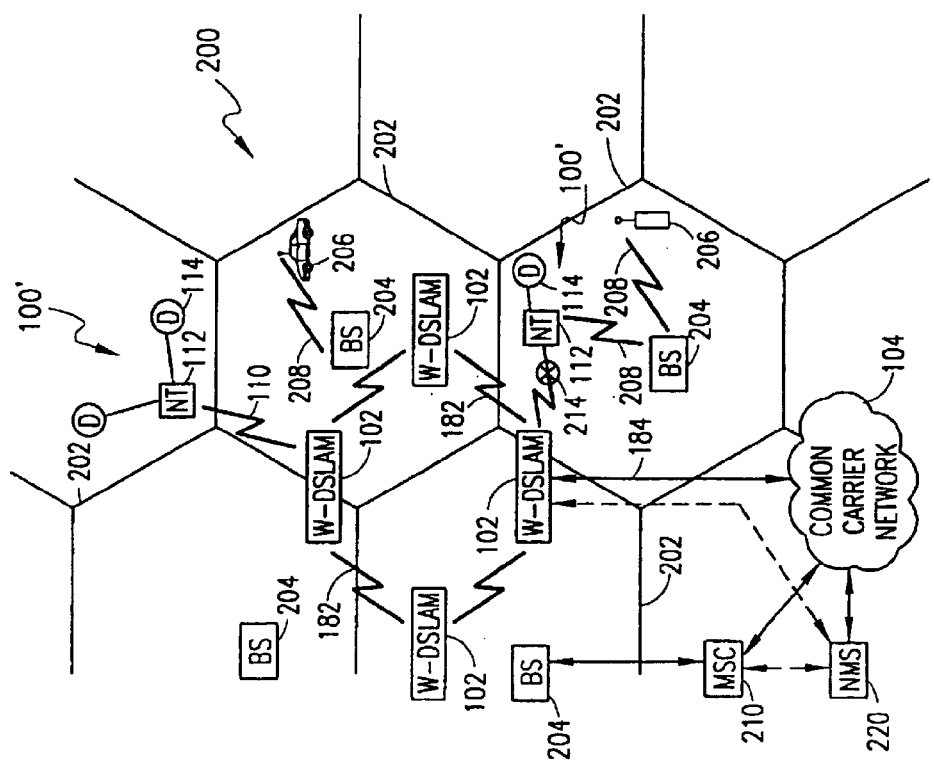
FIG. 3 is a functional block diagram illustrating the relationship between the wireless local loop network of FIG. 2 and an overlaid convention cellular system that provides fallback communications support for local loop subscribers.

Reference is now made to FIG. 3 wherein there is shown a functional block diagram illustrating the relationship between the wireless local loop network of FIG. 2 and an overlaid convention cellular system 200 that provides fallback communications support for local loop subscribers. The cellular communications system 200 comprises a conventional system wherein a service area is divided into a plurality of cells 202 with each cell being serviced by a radio base station 204. Radio communications may be established between the base stations 204 and proximately located cellular mobile stations 206 over an air interface 208 implementing any selected air interface standard (analog, digital TDMA or PCS, CDMA, and the like). The base stations 204 are connected to a mobile switching center 210, with the mobile switching center (acting as a gateway) connected to the common carrier network 104 through one of its ATM switches 106 (see, for example, FIG. 2).

In this configuration, there is some (at least partial if not complete) overlap between the coverage area of the cellular communications system 200 and each of the wireless local loop arrangements 100 (i.e., the W-DSLAM modules 102). It is important to provide the wireless local loop subscribers with fallback communications service in the event there is some failure of the wireless local loop system (as generally indicated at 214 and comprising, for example, a failure of the associated serving W-DSLAM 102, or failure of the gateway W-DSLAM 102 or ATM switch 106 to enable access to the common carrier network 104, or failure of the link 110). The overlaid cellular communications system 200 provides that fallback communications service. In the event it is discovered that a network terminal 112 cannot make access through its wireless local loop arrangement 100' for communication over the wireless local loop system, an order is issued for a wireless communications mode shift with respect to the network terminal from its use of the wireless distribution channel 110 to instead utilize the cellular air interface 208. It is recognized that the throughput supported by the cellular air interface 208 (approximately 384 Kbps) can be substantially reduced in comparison to that provided by the wireless distribution channel 110, and the rate for the communication is accordingly reduced at the mode switch to match the cellular air interface supported throughput. The subscriber may notice a degradation in quality of service being provided as a result of such a mode switch, but this reduced throughput service is much preferred by the subscriber over having no service at all. By way of agreement, the operator of the wireless local loop system and the operator of the cellular system may set the charge (fee), if any, to be paid for fallback use of the cellular system.

To assist with the mode switch process, a network management system (NMS) 220 is provided to monitor the health of the wireless local loop system, detect and correct problems therewith and respond appropriately to emergencies. More particularly, in the context of the fallback support operation discussed above, the network management system 220 functions to detect instances where a network terminal 112 (now stranded) cannot make access through its wireless local loop arrangement 100' to the associated W-DSLAM 102 or where the wireless local loop system is incapable of supporting subscriber communications. Responsive thereto, a determination is made as to which cell 202 (i.e., base station 204) could provide the best communications service (based, for example, on carrier to interference statistics) to the stranded network terminal 112. The network management system 220 then communicates with the overlaid cellular communications system 200 (perhaps through its network management system) to have the base station 204 in the determined best cell 202 make a communications connection with the stranded network terminal 112. If the quality of that communications connection is satisfactory, the network management system 220 orders the communications connection between the common carrier network 104 and the network terminal 112 to be transferred from being carried over the wireless local loop system to instead being carried over the cellular communications system 200. The throughput rate of that transferred communications connection is further adjusted down to account for the limitations of the cellular communications system 200 air interface 208.

Figure 4:
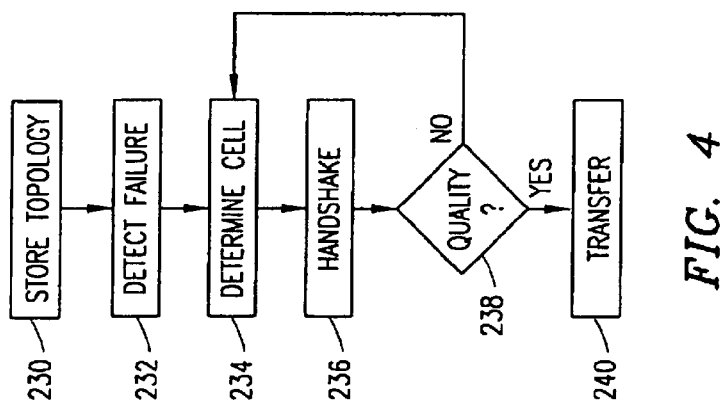
FIG. 4 is flow diagram illustrating a fallback process in accordance with the present invention.

Reference is now made to FIG. 4 wherein there is shown a flow diagram illustrating a fallback process in accordance with the present invention. In step 230, the network management system 220 stores a current access-topology with respect to the wireless local loop system that identifies the connection relationships between the included W-DSLAM modules 102, network terminals 112 and devices 114, as well as any information concerning the overlaid cellular communications system 200 that is necessary to support fallback. Next, in step 232, a failure in the wireless local loop system is detected that would leave a given network terminal 112 stranded with respect to its communications service. Responsive thereto, in step 234, a determination is made as which cell 202 provides the best communications service to the stranded network terminal 112. That determined cell then engages in a handshake operation with the stranded network terminal 112 (step 236). A determination is then made in step 238 as to whether the communications quality of that performed handshake operation is satisfactory. If no, the process returns to step 234 to choose another cell. If yes, the communications connection between the common carrier network 104 and the network terminal 112 is transferred in step 240 from being carried over the wireless local loop system to instead being carried over the cellular communications system 200. Included in this step 240 is an appropriate adjustment of the throughput rate for that transferred communications connection account for the limitations of the cellular communications system 200 air interface 208.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A wireless local loop communications system, comprising:

a plurality of digital subscriber line access multiplexers interconnected with each other in a ring topology via first wireless communications links; and at least one network terminal associated with each of certain ones of the plurality of digital subscriber line access multiplexers, each network terminal providing local loop access to a connected subscriber device and being connected to its associated digital subscriber line access multiplexer via a second wireless communications link;

wherein the first wireless communications links support a first transmission throughput rate and the second wireless communications link supports a second transmission throughput rate, wherein the second transmission throughput rate is less than the first transmission throughput rate and each digital subscriber line access multiplexer operates to multiplex plural second communications link flows into an aggregate first communications link flow.

2. The system as in claim 1 further including an interface to a common carrier network.

3. The system as in claim 1 wherein each network terminal is capable of operation in a first mode to utilize the second wireless communication link to support communications and a second mode to utilize an air interface of an overlaid cellular communications system to support communications, the system further comprising:

a network management system operating to detect a failure in the wireless local loop system that would leave a certain network terminal stranded with respect to its subscriber communications service, and respond thereto by ordering the stranded network terminal to switch from the first mode to the second mode.

4. The system as in claim 3 wherein the cellular air interface supports a third transmission throughput rate that is less than the second transmission throughput rate of the second wireless communications link, the switch to the second mode include an appropriate adjustment in the rate of the subscriber device communications to account for the difference in the throughput supported by the second wireless communications link and the throughput supported by the cellular air interface.

5. A network terminal for use in a wireless local loop communications system, the network terminal providing local loop access to a connected subscriber device and having multiple wireless operational modes including:

a first mode that utilizes a high speed wireless communication link provided by a wireless local loop communications system to support subscriber device communications; and a second mode that utilizes a low speed wireless air interface communications link provided by an overlaid cellular communications system to support subscriber device communications;

wherein the network terminal preferably operates in the first mode and switches to the second mode to utilize the overlaid cellular communications system when communications with the wireless local loop communications system fail.

6. The network terminal of claim 5 wherein a switch to the second mode includes an appropriate adjustment in the rate of the subscriber device communications to account for the difference in the throughput supported by high speed wireless communication link provided by a wireless local loop communications system and the throughput supported by the low speed wireless air interface communications link provided by an overlaid cellular communications system.

7. The network terminal of claim 5 wherein the second mode communicates with an overlaid cellular communications system of the type selected from the group consisting of: digital TDMA; digital PCB; and CDMA.

8. A method to provide fallback communications service for network terminal of a wireless local loop communications system, comprising the steps of:

detecting a failure in the wireless local loop system that would leave the network terminal stranded with respect to its subscriber communications service;

determining in response to the detected failure which one of a plurality of cells in an overlaid cellular communications system would provide the best communications service to the stranded network terminal;

confirming communications capability between the a determined cell and the stranded network terminal; and initiating a transfer of network terminal communications from being carried over the wireless local loop system to instead being carried over the cellular communications system.

9. The method as in claim 8 wherein the step of confirming comprises the steps of:

having the determined cell engage in a handshake operation with the stranded network terminal; and evaluating the communications quality of the handshake operation to confirm satisfactory communications capability between the determined cell and the stranded network terminal.

10. The method as in claim 8 wherein the step of transferring comprises the step of:

adjusting a throughput rate for the transferred network terminal communications to account for any differences in the throughput rates of the wireless local loop system and the cellular communications system.

* * * * *